May 1, 1951      M. BRINSON      2,551,313

ROTARY HOE WHEEL

Filed May 7, 1949

INVENTOR.
MERRILL BRINSON,
BY: Harold B. Hood,
ATTORNEY.

Patented May 1, 1951

UNITED STATES PATENT OFFICE 2,551,313

ROTARY HOE WHEEL

Merrill Brinson, Muncie, Ind., assignor to Climax Machinery Company, Indianapolis, Ind., a corporation of Indiana Application May 7, 1949, Serial No. 91,931

1 Claim. (Cl. 97—216)

The present invention relates to a rotary hoe wheel, and is particularly concerned with the provision of a novel and improved wheel for a rotary hoe, of such character as to facilitate and render less expensive the manufacture of such wheels, and to guard against damage thereto in use. It is the primary object of the invention to provide such a wheel made up of mating sheet metal elements, suitably supported upon hub means, and constructed to mount and to support a plurality of radiating, double-pronged teeth. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Figure 1:
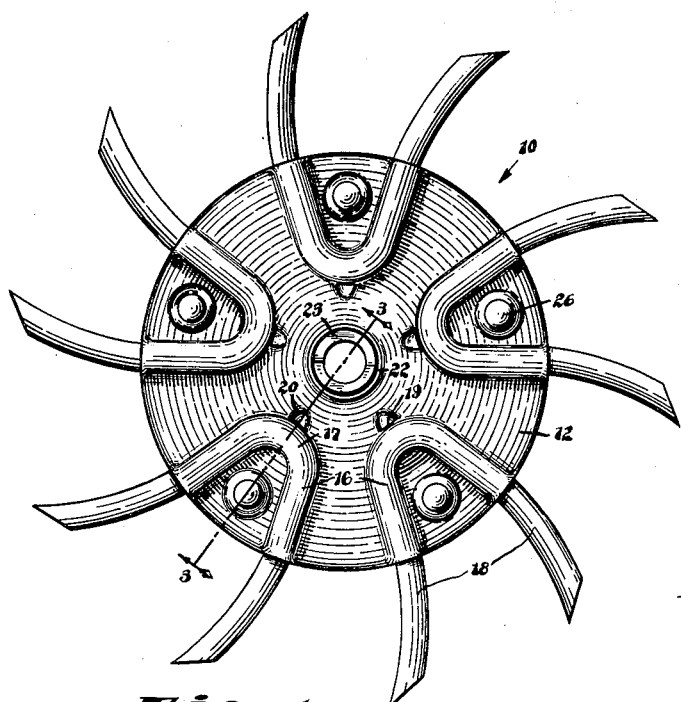
Fig. 1 is a side elevation of a wheel constructed in accordance with my present invention.
Figure 2:
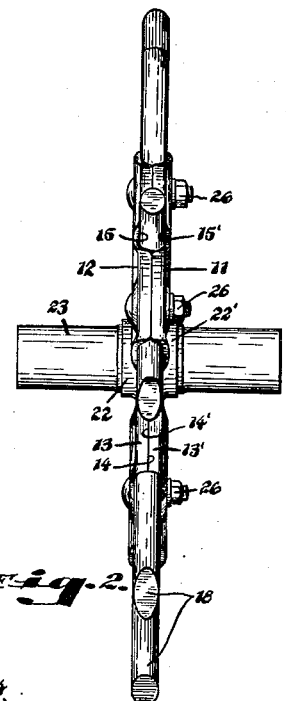
Fig. 2 is an end elevation thereof.
Figure 4:
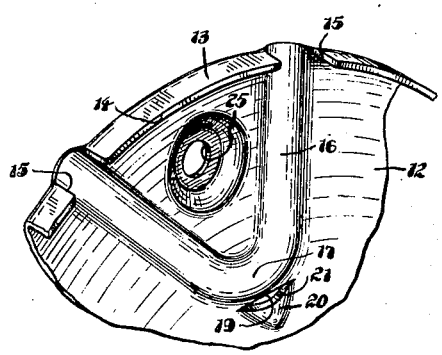
Fig. 4 is a fragmental perspective of one of the sheet metal disc elements.

Referring more particularly to the drawings, it will be seen that I have illustrated a wheel, indicated generally by the reference numeral 10, the central portion of which constitutes two mating sheet metal discs 11 and 12. The disc 12 is shaped to provide a perimetral, axially-projecting flange 13 which is continuous except for a plurality of perimetrally spaced pairs of notches 15, 15. The disc 11 is provided with a similar flange 13' having similar notches 15', the axially-facing edges 14 and 14' of the flanges 13 and 13' being adapted for mutual engagement when the discs 11 and 12 are assembled in mating relation, and the notches 15' registering with the notches 15.

The metal of the disc 12 is deformed outwardly, at a plurality of peripherally spaced regions, to provide substantially V-shaped grooves 16, opening in the direction of projection of the flange 13, each groove having its legs symmetrically arranged relative to a radius of the disc, and terminating in registry with a pair of notches 15, 15. The base portion 17 of each groove is disposed upon such radius, and is radially spaced outwardly from the center of the disc. Similar grooves 16' are similarly arranged in the disc 11 in such manner that, when the two discs are brought into mating relation, each groove 16' will register with a groove 16.

A generally V-shaped, double-pronged tooth 18 is arranged in each pair of mating grooves 16 and 16', with its legs projecting through the notches 15 and 15' and extending outwardly beyond the peripheries of the discs 11 and 12. When the two discs are assembled, the notches 15 and 15' snugly engage the tooth legs, and the surfaces 14 and 14' lie in mutual engagement, whereby the assembly is substantially sealed against the penetration of dirt into the space between the two discs.

Each disc is centrally perforated and is provided with an outturned flange 22 or 22' adapted to be snugly sleeved upon a hub element 23; and preferably said flanges 22 and 22' will be welded to such hub element. The hub element is formed with an integral collar 24 against which the inner surfaces of the discs 11 and 12 abut. If desired, the hub means may comprise two separate elements, each secured within the flange 22 or 22' of one of the discs 11 and 12. Preferably, each disc will be formed, in the region between the legs of each groove 16, with a perforation 25 or 25', and a bolt or rivet 26 will be projected through each pair of perforations 25 and 25' to aid in securing the discs 11 and 12 in assembled relation.

Figure 3:
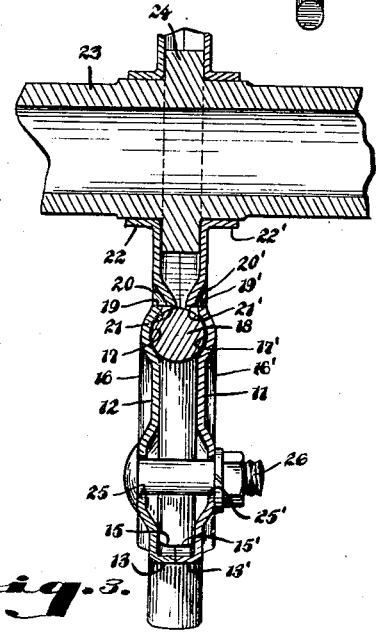
Fig. 3 is an enlarged fragmental section therethrough.

It will be seen that this construction provides an inexpensive yet effective wheel mounting for the teeth 18 and that, under ordinary circumstances, the structure above described might be satisfactory for use. However, since the inner surfaces of the grooves 16 and 16' engage flaring or rounded surfaces of the teeth 18, and since the discs are made of malleable sheet metal, it will be clear that heavy forces exerted radially inwardly against the teeth 18 might result in flexure or bulging of the material of the discs 11 and 12 outwardly to permit radially inward displacement of such teeth. I have solved that problem very effectively, and substantially without added cost, by forming, at the base 17 of each groove, a short, chordal slit 19, and by axially inwardly deforming the metal of the disc, at the radially inward boundary of each slit, in an axially-inward direction, as at 20, to provide a rigid abutment surface 21 for the V base of each tooth. This arrangement is perhaps most advantageously illustrated in Fig. 3, in which it will be seen that the tooth 18 engages the surfaces 21 and 21' in such a relation that radially inwardly directed forces applied to the tooth have substantially no axially outwardly directed camming effect upon the deformed portions 20 and 20', comparable to the camming effect of such forces upon the radially inwardly located portions of the groove bases 17 and 17'. I have found that, whereas radially inwardly directed forces exerted upon the teeth 18 will deform the discs to loosen the tooth mountings in the absence of the deformed portions 20 and 20', similar forces exerted on the teeth, when the deformed portions 20 and 20' are present, are ineffective to damage the assembly.

I claim as my invention:

A rotary hoe wheel comprising a pair of mating, sheet metal discs, each disc providing a perimetral, axially-extending flange continuous except for a plurality of pairs of peripherally-separated notches, each disc being provided with a generally V-shaped groove for each pair of notches, each such groove opening in the direction of extension of said flange, and the legs of each groove terminating in its related pair of notches, a double-pronged tooth for each groove having an anchorage portion received in such groove and having its prongs projecting through said notches, said discs being secured together with their grooves and notches in registry and the terminal edges of their flanges in substantial dirt-sealing engagement, each disc being provided, at the V-base of each groove, with a chordal slit, the metal immediately radially inward from each said slit being displaced in the direction of extension of said disc flange.

MERRILL BRINSON.

REFERENCES CITED

The following references are of record in the file of this patent:

UNITED STATES PATENTS

| Number | Name | Date |
|---|---|---|
| 270,742 | Carr | Jan 16, 1883 |
| 628,862 | Smith | July 11, 1899 |
| 815,611 | Martindale | Mar. 20, 1906 |
| 823,240 | Waterman | June 12, 1906 |
| 1,141,765 | Bullard | June 1, 1915 |
| 1,444,224 | Wagner | Feb. 6, 1923 |
| 2,406,500 | Karl | Aug. 27, 1946 |

FOREIGN PATENTS

| Number | Country | Date |
|---|---|---|
| 621 of 1852 | Great Britain | Nov. 2, 1852 |